United States Patent [19]

Grimes

[11] Patent Number: 5,388,147
[45] Date of Patent: Feb. 7, 1995

[54] CELLULAR TELECOMMUNICATION SWITCHING SYSTEM FOR PROVIDING PUBLIC EMERGENCY CALL LOCATION INFORMATION

[75] Inventor: Gary J. Grimes, Thornton, Colo.

[73] Assignee: AT&T Corp., Murray Hill, N.J.

[21] Appl. No.: 113,948

[22] Filed: Aug. 30, 1993

[51] Int. Cl.[6] .......................................... H04M 11/00
[52] U.S. Cl. ....................................... 379/59; 379/37; 379/45; 379/58
[58] Field of Search .................. 379/37, 40, 45, 49, 379/50, 51, 58, 59; 342/457

[56] References Cited

U.S. PATENT DOCUMENTS

| | | | |
|---|---|---|---|
| 4,788,711 | 11/1988 | Nasco, Jr. | 379/59 |
| 4,893,325 | 1/1990 | Pankonen et al. | 379/45 |
| 4,924,491 | 5/1990 | Compton et al. | 379/49 |
| 5,122,959 | 6/1992 | Nathanson et al. | 364/436 |
| 5,195,126 | 3/1993 | Carrier et al. | 379/45 |
| 5,203,009 | 4/1993 | Bogusz et al. | 455/33.1 |
| 5,218,637 | 6/1993 | Sheffer et al. | 379/59 |
| 5,223,844 | 6/1993 | Mansell et al. | 342/457 |

FOREIGN PATENT DOCUMENTS 0179527  7/1989  Japan ................................... 379/283

OTHER PUBLICATIONS

Sales brochure from Pactel Teletrac, Jan. 1993.
J. Candler, *Ways to Outsmart Vehicle Thieves*, Nation's Business, Jul. 1993, 35–36.

*Primary Examiner*—Curtis Kuntz
*Assistant Examiner*—I. S. Rana
*Attorney, Agent, or Firm*—John C. Moran

[57] ABSTRACT

A cellular telecommunication switching system responsive to an emergency call from a cellular telephone to request that the geo-coordinates be transmitted from the cellular telephone and to convert those coordinates into conventional municipality or rural address location information. In one embodiment, the cellular telecommunication switching system utilizes an internal database to convert the geo-coordinates to location information. In another embodiment, the cellular telecommunication switching system utilizes an external database to perform this conversion. In yet a third embodiment, a cellular telephone performs the conversion and transmits to the cellular telecommunication switching system the location information.

16 Claims, 14 Drawing Sheets

CELLULAR TERMINAL 133

EMERGENCY SERVICE CELLULAR TERMINAL

CELLULAR TELECOMMUNICATION SWITCHING SYSTEM FOR PROVIDING PUBLIC EMERGENCY CALL LOCATION INFORMATION

CROSS-REFERENCE TO RELATED APPLICATIONS

G. J. Grimes, "Public Emergency Call Telecommunication Switching System", Ser. No. 08/113,446; and G. J. Grimes, "Cellular Terminal For Providing Public Emergency Call Location Information", Ser. No. 08/113,949.

These applications are filed concurrently with this application and are assigned to the same assignee.

1. Technical Field

This invention relates to cellular telecommunication switching systems for providing public emergency service; and, in particular, to the identifying the location of calling telephone terminals.

2. Background of the Invention

Providers of emergency services such as in fire, police, and rescue departments have been greatly aided in their efforts to provide service to individuals in need by the introduction of the 911 emergency number which is now prevalent in the United States. One of the important aspects of the 911 emergency service is the fact that the public safety answering point (PSAP) system utilized by the emergency provider obtains from the telephone system the calling parties calling telephone number. Utilizing this calling telephone number, the PSAP system accesses a remote database containing information relating telephone numbers to users' names and addresses and obtains from this remote database the calling telephone user's name and billing address. For a wired telephone, the billing address is the address where the telephone is located. Of course, the address information, which effectively is location information, is the most important, since often the calling party is incapable of supplying the location information or does not have sufficient time to supply this information. The location information allows the emergency service provider to direct assistance to this location.

Unfortunately, when the calling telephone is a cellular telephone, the telephone billing address is of no value in determining the present location of the cellular telephone. Prior art cellular telecommunication switching systems do not distinguish between an ordinary call and a 911 call. Further, the prior art cellular telecommunication switching systems have no precise information with respect to the actual location of a cellular telephone.

U.S. Pat. No. 5,122,959 discloses a vehicle location system for utilization by an owner of a fleet of vehicles. The disclosed system is utilized to determine the location of vehicles based on information that is transmitted from the vehicle to a central computer. A unit in the vehicle determines its position using the United States government's Global Positioning System (GPS) or other position locating devices. Geo-coordinates that are obtained from GPS are transmitted back to the central computer by a radio link. The central computer then displays the location of the vehicle on a map displayed on a computer display. In a similar system sold by PacTel Teletrac, the transceiver in the vehicle is equipped with an alert button which when pressed by the driver of the vehicle instantly alerts the dispatcher at the central computer of an emergency. The dispatcher at the central computer can then determine the location of the vehicle by utilizing the computer display.

Clearly, there is a need in the art for a cellular telecommunication switching system system which can differentiate an ordinary call from a 911 call and process the 911 call differently. Also, the cellular telecommunication switching system should accept geo-positioning coordinates from the requesting cellular telephone and determine the location of the requesting cellular telephone from those coordinates. Further, the cellular telecommunication switching system must be capable of obtaining additional information defining a vehicle from which the call is being transmitted from to assist emergency service personnel in locating this vehicle.

SUMMARY OF THE INVENTION

This invention is directed to solving these and other disadvantages of the prior art. According to a first aspect of the invention, a cellular telecommunication switching system is responsive to an emergency call from a cellular telephone to request the geo-coordinates be transmitted from the cellular telephone and to convert those coordinates into conventional municipality or rural address location information. In one embodiment of the invention, the cellular telecommunication switching system utilizes an internal database to convert the geo-coordinates to location information. In another embodiment of the invention, the cellular telecommunication switching system utilizes an external database to perform this conversion. In yet a third embodiment, a cellular telephone performs the conversion and transmits to the cellular telecommunication switching system the location information.

In accordance with another aspect of the invention, a cellular telephone includes a global satellite positioning device and upon the user of the cellular telephone placing an emergency telephone call, the cellular telephone interrogates the GPS device to obtain the geo-coordinates. The cellular telephone then transmits to the cellular telecommunication switching system the geo-coordinates, when the cellular telecommunication switching system requests those coordinates. In addition, the cellular telephone unit transmits to the cellular telecommunication switching system pre-defined vehicle description information if the cellular telephone is being utilized within a vehicle. This pre-defined vehicle description information is entered by the user of the cellular telephone. If the cellular telephone is a hand held unit, the cellular telephone can be programmed to transmit personal characteristics of the person using the cellular telephone. The cellular telecommunication switching system is responsive to the vehicle or personal information to relay that information to PSAP handling the emergency call.

DETAILED DESCRIPTION

Figure 1:
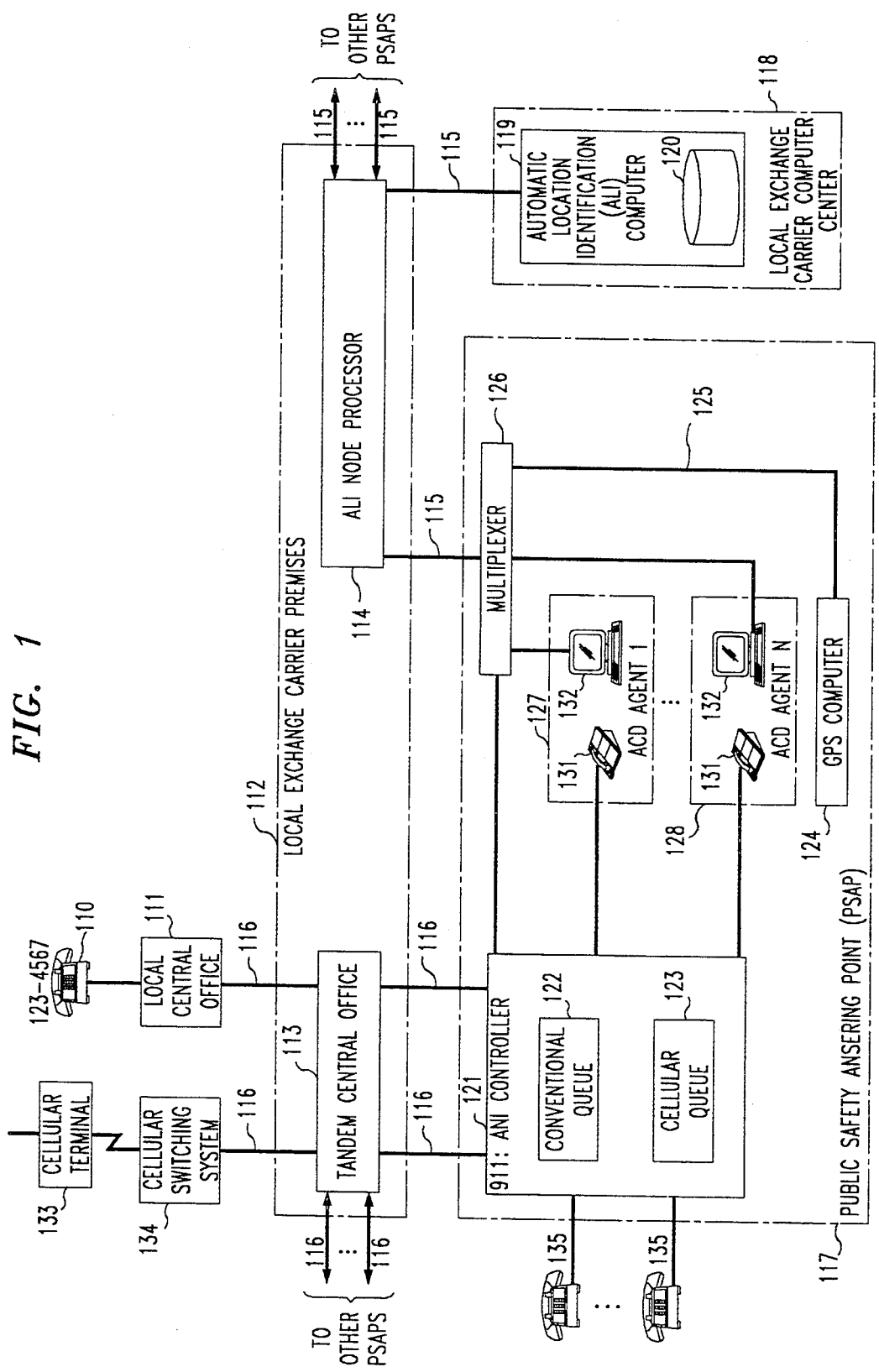
FIG. 1 illustrates a tint embodiment of a public emergency call telecommunication switching in accordance with the invention.
Figure 2:
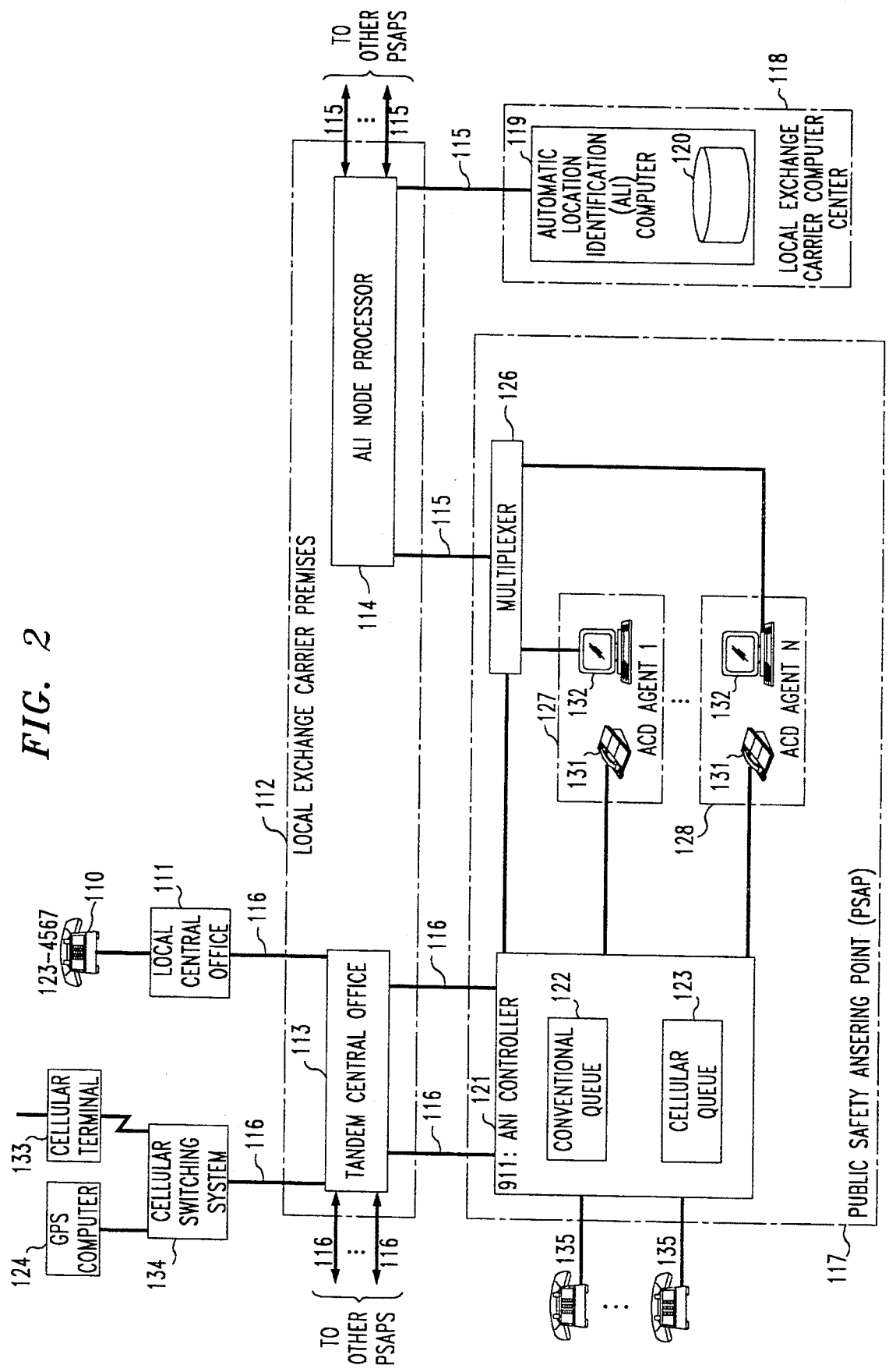
FIG. 2 illustrates a second embodiment of a public emergency call telecommunication switching in accordance with the invention.

FIG. 2 illustrates a public emergency call telecommunication switching system using cellular switching system 134 to establish digital communication between a cellular terminal, such as cellular terminal 134, originating an emergency call and public safety answering point (PSAP) 117. In addition, cellular switching system 134 is responsive to the emergency call to request the transmission of geo-coordinates from the cellular terminal. Cellular switching system 134 converts the geo-coordinates to location information which is in terms of standard municipality or rural destinations. Cellular switching system 134 utilizes GPS computer 124 to convert the geo-coordinates to the location information. FIG. 1 illustrates a second embodiment of cellular switching system 134 that functions with cellular terminals that internally convert geo-coordinates to location information. The second embodiment also establishes digital communication between a cellular terminal originating an emergency call and PSAP 117. In addition, cellular switching system 134 is responsive to the emergency call to request the transmission of location information from the cellular terminal.

PSAP 117 is the facility at which emergency telephone calls are answered and the provisioning of emergency services is initiated. Whereas, the 911 number is the most common emergency number, various local governmental agencies have set up other emergency telephone numbers which are also transferred to PSAP 117. PSAP 117 responds to emergency telephone calls received when these other emergency telephone numbers are dialed in the same manner as it responds to an emergency call dialed using the 911 number. The illustrative PSAP 117 shown is an E911 emergency system. Systems of this kind are well known. (See, for example, "E911 Public Safety Answering Point: Interface Between a 1/1AESS TM Switch and Customer Premises Equipment", Technical Reference TR-TSY-000350, Issue 1, November 1987, by Bell Communications Research). PSAP 117 includes 911 automatic number identification (ANI) controller 121. Controller 121 is illustratively the AT&T System 85/E911 running AT&T automatic call distribution (ACD) software. Controller 121 provides private branch exchange (PBX)-type functions for the incoming emergency calls, including call-switching functions and call-distribution functions to emergency service agents' positions 127–128. Since controller 121 is based on a PBX such as the AT&T System 85, controller 121 may also be functioning as a conventional PBX and serving non-emergency calls, and a community of users 135 other than agents responsible for handling emergency calls, along with the emergency calls and the emergency call-handling agents. In that case, controller 121 switches received emergency calls (identified as such by the trunks over which they are received at controller 121) to the emergency call-handling agents, and switches other calls to the other users in a conventional PBX-like manner.

PSAP 117 includes a plurality of agent positions 127–128 for answering the emergency calls. Each position 127–128 includes a voice terminal 131, such as a multi-function telephone set, for answering the emergency voice calls, and a display monitoring unit (DMU) 132, such as a data terminal, for displaying data information associated with the call. Each agent position 127–128 is illustratively the AT&T display management system (DMS).

Unlike a conventional PSAP, PSAP 117 is capable of providing emergency service not only for wired telephones such as telephone 10 but also cellular terminals such as cellular terminal 133 in accordance with the invention. When an emergency call is received from telephone 10, local central office 11 provides automatic number identification (ANI) which results in the telephone number of telephone 110 being transmitted to PSAP 117. PSAP 117 then accesses automatic location identification (ALI) processor 114 and ALI computer 119 to obtain the location information. In accordance with the invention, if the emergency call is from cellular terminal 133, cellular terminal 133 determines its geo-coordinates using an attached GPS device and transmits these coordinates along with the emergency call information to cellular switching system 134. In response, cellular switching system 134 transmits this information to PSAP 117. PSAP 117 is responsive to the geo-coordinate information to access GPS computer 124 via multiplexer 126. GPS computer 124 maintains a database that defines the conversion from geo-coordinates to location information in terms of municipal and rural designations. GPS computer 124 can be an integral part of PSAP 117 or can be an externally located computer such as ALI computer 119. In another embodiment of the invention, which is illustrated in FIG. 2, cellular switching system 134 has an attached GPS computer 124. Upon receiving the geo-coordinates from cellular terminal 133, cellular switching system 134 accesses GPS computer 124 obtains the location information and transmits that information to PSAP 117. The following paragraphs first describe the conventional manner in which a PSAP provides emergency service when calls are received from a wired telephone and, then, describes how emergency service is provided when the emergency call is from a cellular terminal.

For conventional emergency calls, PSAP 117 receives emergency calls through tandem central office 113 located on local exchange carder premises 112. Tandem central office 113 is connected by central office and E911 trunks 116 to PSAP 117 as well as to other PSAPs, and by interoffice trunks 116 to telephone local central offices 111, of which one is shown. The local central offices are in turn connected to terminal equipment 110 of telephone service subscribers. Local central offices 111 provides automatic number identification (ANI) which is to provide a called party with the telephone number of the calling party.

A local central office 111 which receives a "911" call from telephone 110 automatically connects the call over a trunk 116 to tandem central office 113 and forwards to office 113 the calling telephone number. Based on the received telephone number, office 113 connects the call over trunk 116 to one of the PSAPs and forwards to that PSAP the calling telephone number.

Office 113 also connects non-911 calls destined for PSAPs to the appropriate PSAPs over trunks 116. For any PSAP, however, the non-911 calls are connected over trunks 116 which are different from trunks 116 over which the 911 calls are connected.

Assuming that the call comes to PSAP 117, it is received by controller 121. If it is a non-911 call, it is connected by controller 121 to call-destination one of the community of users 135, in a conventional manner. If it is a 911 call and includes the calling telephone number, it is stored in first-in, first-out conventional queue 122 to await the freeing of an agent at one of the positions 127-128 to receive the call. The presences of the calling telephone number or geo-coordinates determines the type of 911 call. In the present example, the calling telephone number of the call is captured and is stored in memory along with other information about the call by controller 121. Calls are retrieved from queue 122 and distributed to positions 127-128 by controller 121. When controller 121 assigns a call to a position 127-128, controller 121 also formulates and sends a message to multiplexer 126 requesting information on the calling number be obtained from ALI computer 119 and transmitted to the assigned position by multiplexer 126. The calling number of the call and the identification of the position 127-128 to which the call has been assigned are provided by controller 121 in the message.

Multiplexer 126 is connected by one or more links 115 to ALI node processor 114. Multiplexer 126 forwards the message to ALI node processor 114. ALI node processor 114 is located on local exchange carrier premises 112 and is connected by links 115 to PSAP 117 and to other PSAPs, and also to ALI computer 119. ALI node processor 114 acts as a concentrator and deconcentrator, forwarding messages received from the PSAPs to ALI computer 119 and forwarding message responses received from ALI computer 119 to the appropriate PSAPs.

ALI computer 119 is located at computer center 118 of the local exchange carrier. Center 118 is typically remote from premises 112 and from PSAPs. ALI computer 119 manages database 120 which contains information associated with telephone numbers. The associated information includes items of information such as the name and the address of the subscriber to whom the number is assigned, personal data concerning the subscriber that may be of help to emergency service personnel, and the phone numbers of the subscriber's local police, fire and rescue departments.

In response to receipt of a message requesting the information associated with a telephone number, ALI computer 119 retrieves the information from database 120, formats it into a response message, and sends the response message to ALI node processor 114. Processor 114 in turn sends the response to the appropriate PSAP—the PSAP 117 in this example—where it is received by multiplexer 126 and forwarded to the agent position 127-128 that has been assigned to handle the call. When the agent at the position 127-128 answers the call, the data associated with the call's originating number are displayed on the position's DMU 132.

For cellular emergency calls, PSAP 117 receives emergency calls from cellular switching system 134 via tandem central office 113. When the cellular emergency call comes to PSAP 117, it is received by controller 121. Since it is a cellular 911 call, controller 121 detects the geo-coordinates in the call information and determines that it is a cellular 911 call. Since the call is a cellular 911 call, it is stored in first-in, first-out cellular queue 123 to await the freeing of an agent at one of the positions 127-128 to receive the call. The geo-coordinates are stored in memory along with other information about the call. When the call is retrieved from queue 123 and assigned to one of the positions 127-128 by controller 121, controller 121 also formats and sends a message to multiplexer 126 requesting municipal location information concerning the geo-coordinates be obtained from GPS computer 124. The geo-coordinates of the call and the identification of the position 127-128 to which the call has been assigned are provided by controller 121 in the message.

Multiplexer 126 is connected via link 125 to GPS computer 124. Multiplexer 126 forwards the message to GPS computer 124, and GPS computer 124 accesses an internal database and converts the geo-coordinates to location information. This location information is then transmitted by GPS computer 124 to the agent position 127-128 that has been assigned to handle the cellular call. When the agent at the assigned position answers the cellular call, the municipal location information is displayed on that position's DMU. Controller 121 had previously alerted the assigned agent to the incoming 911 cellular call.

With respect to FIG. 2, a 911 cellular call is handled in a similar manner to that described for FIG. 1 with the following exceptions. Upon receiving a 911 cellular call, cellular switching system 134 accesses GPS computer 124 to determine the location information. That location information is then transmitted along with the call to PSAP 117 via tandem central office 113. Controller 121 is responsive to the location information to store that information in memory along with other information about the call upon entering the call into cellular queue 123. Controller 121 then assigns the cellular call to one of the positions 127-128 and transmits the municipal location information to multiplexer 126 which redistributes that information to the assigned position.

Figure 3:
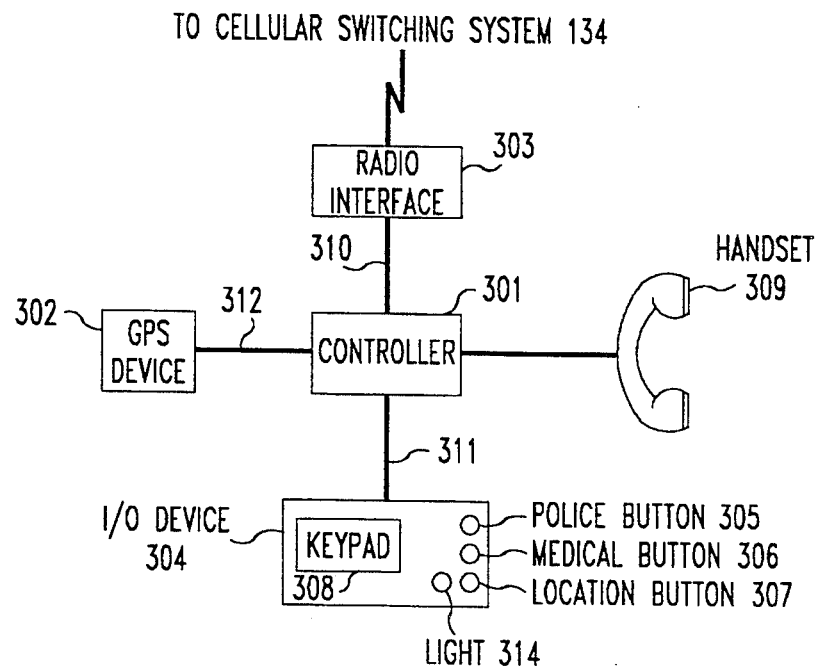
FIG. 3 illustrates, in block diagram form, a cellular terminal.

FIG. 3 illustrates cellular terminal 133 in greater detail. Radio interface 303 provides the radio link to cellular switching system 134 of FIG. 1 for the transmission of audio and digital data. Controller 301 provides the overall control of cellular terminal 133. GPS device 302 provides the geo-coordinates when requested by controller 301 via bus 312. GPS device 302 obtains the geo-coordinates by processing radio signals from the GPS system using methods well known in the art. I/O device 304 provides a mechanism by which the user of cellular terminal 133 initiates operations. Handset 309 is utilized to allow the user to communicate audio information. In another embodiment of cellular terminal 133, GPS device 302 is not part of cellular terminal 133. GPS device 302 is either a stand alone unit or is part of another system. Bus 312 gives cellular terminal 133 access to GPS device 302. In a motor vehicle, GPS device 302 could be part of an online trip computer. Such an arrangement allows a GPS device to be used for two functions.

There are two ways in which the user can place a 911 call. First, the user can dial 911 utilizing keypad 308, and second, the user can actuate either police button 305 or medical button 306. In addition, other emergency services could have their own button such as a fire button to summon the fire department. Consider the first method of placing a 911 call. When the user dials 911 on keypad 308, this information is transmitted to controller 301 via bus 311. Controller 301 is responsive to the dialed digits to access GPS device 302 to obtain the geo-coordinates. Controller 301 then places an emergency cellular call to cellular switching system 134. When cellular switching system 134 responds, controller 301 transmits to it the geo-coordinates. In another embodiment, cellular switching system 134 requests the geo-coordinates. Upon receiving such a request, controller 301 accesses GPS device 302 to obtain the geo-coordinates and then, transmits the geo-coordinates to cellular switching system 134. After the call has been placed, controller 301 establishes an audio communication path between handset 309 and radio interface 303. If upon attempting to transmit the geo-coordinates in digital form to cellular switching system 134, controller 301 determines that cellular switching system 134 is not capable of accepting this information, it lights light 314 that is associated with location button 307 on I/O device 304. Once the call has been established to an agent in PSAP 117, the user has the geo-coordinate information transmitted to the agent in voice form as audio information by actuating location button 307. Controller 301 uses an internal voice synthesizer to convert the digital information from GPS device 302 to voice form. In another embodiment, where an all digital protocol is being used such as ISDN, the actuation of location button 307 would send the information as digital data directly to PSAP 117 which would then utilize this information in a the normal manner.

In situations where the user cannot dial 911 utilizing keypad 308 and is unable to speak with the agent assigned to the 911 call, the user can actuate either police button 305 or medical button 306. Controller 309 is responsive to the actuation of police button 305 to place the 911 cellular call to PSAP 117 via cellular switching system 134 as previously described. However, when the agent answers the call controller 301 transmits a synthesized voice message informing the agent that this is a request for police assistance. This message is periodically be repeated. In addition, controller 301 constantly monitors the geo-coordinates by accessing GPS device 302 on an on-going basis. If the coordinates are changing, controller 301 transmits the direction and rate at which the coordinates are changing via voice messages to the assigned agent plus the new coordinates at predefined time intervals. Actuation of medical button 306 causes controller 301 to transmit a message requesting medical assistance.

If cellular terminal 133 is being utilized in a vehicle, the user has the option of storing in an internal memory of controller 301 vehicle identification information. This vehicle identification information would include the license plate, make and year of the car, and the color of the vehicle. The vehicle information is entered via keypad 308. Controller 301 transmits this information as digital information at the same time as the geo-coordinates are being transmitted to PSAP 117. The vehicle information is displayed on the DMU of the agent assigned to the 911 call. In the other embodiment where it was necessary to send the geo-coordinates in voice form as audio information, the vehicle information would be sent in voice form as audio information also. In addition, actuation of either the police button 305 or medical button 306 causes the transmission of the vehicle information also. In addition, personal medical information could be entered into controller 301 via keypad 308. This personal medical information is transmitted upon actuation of medical button 306.

If cellular terminal 133 is being utilized as a hand held unit, the user has the option of storing in the internal memory of controller 301 personal characteristics which would assist emergency personnel in identifying the user visually. In addition, the user could store personal medical information. This personal information is entered via keypad 308. Controller 301 transmits this information as digital information at the same time as the geo-coordinates are being transmitted to PSAP 117. As previously described, in the other embodiment where it was necessary to send the geo-coordinates in voice form as audio information, the personal information would be sent in voice form as audio information also.

Figure 4:
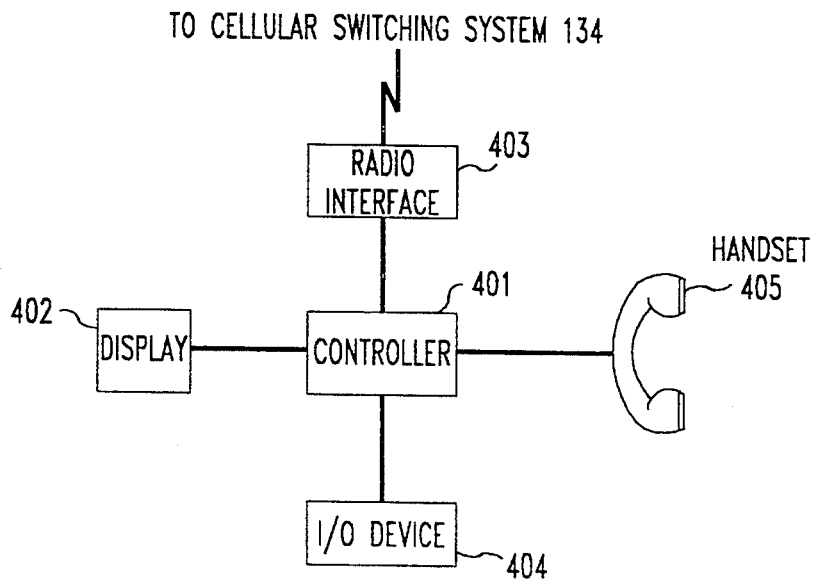
FIG. 4 illustrates, in block diagram form, an emergency service cellular telephone for utilization in an emergency service vehicle.

Further in accordance with the invention, once an emergency call has been transferred to an agent position and the agent has selected an emergency vehicle to respond to the emergency call, the agent will establish a digital communication call to the cellular terminal in the emergency service vehicle if that service cellular terminal is capable of receiving and displaying digital information. Such an emergency service cellular terminal is illustrated in FIG. 4. If the emergency service vehicle is so equipped, the agent will establish a call via controller 121, tandem central office 113, and cellular switching system 134 to the service cellular terminal. Further, the agent will request that controller 121 transmit to the service cellular terminal all digital information being received from cellular terminal 133 which is originating the emergency call. Emergency service cellular terminal consists of blocks 401–405. Controller 401 provides overall control of the service cellular terminal, radio interface 403 is utilized to receive and transmit information with cellular switching system 134. I/O device 404 is utilized by the user of the terminal to communicate with controller 401. Handset 405 is utilized for audio communication. Display 402 is an alphanumeric display device capable of displaying textual and graphical information. As digital information is received from controller 121 concerning the location and other descriptive information, controller 401 displays this information on display 402. This is particularly useful where cellular terminal 133 is in a vehicle in motion since it allows the emergency service personnel in the emergency service vehicle to obtain the changing location information. Advantageously, once the call has been placed to the emergency service cellular terminal and the service personnel are in digital and audio communication with cellular terminal 133, the agent may remove themselves from the emergency call. The agent will be automatically brought back into the emergency call if requested by the emergency service personnel or if the call is terminated by either the emergency service cellular terminal or cellular terminal 133. This operation allows maximum use to be made of the agents of PSAP 117.

Figure 5:
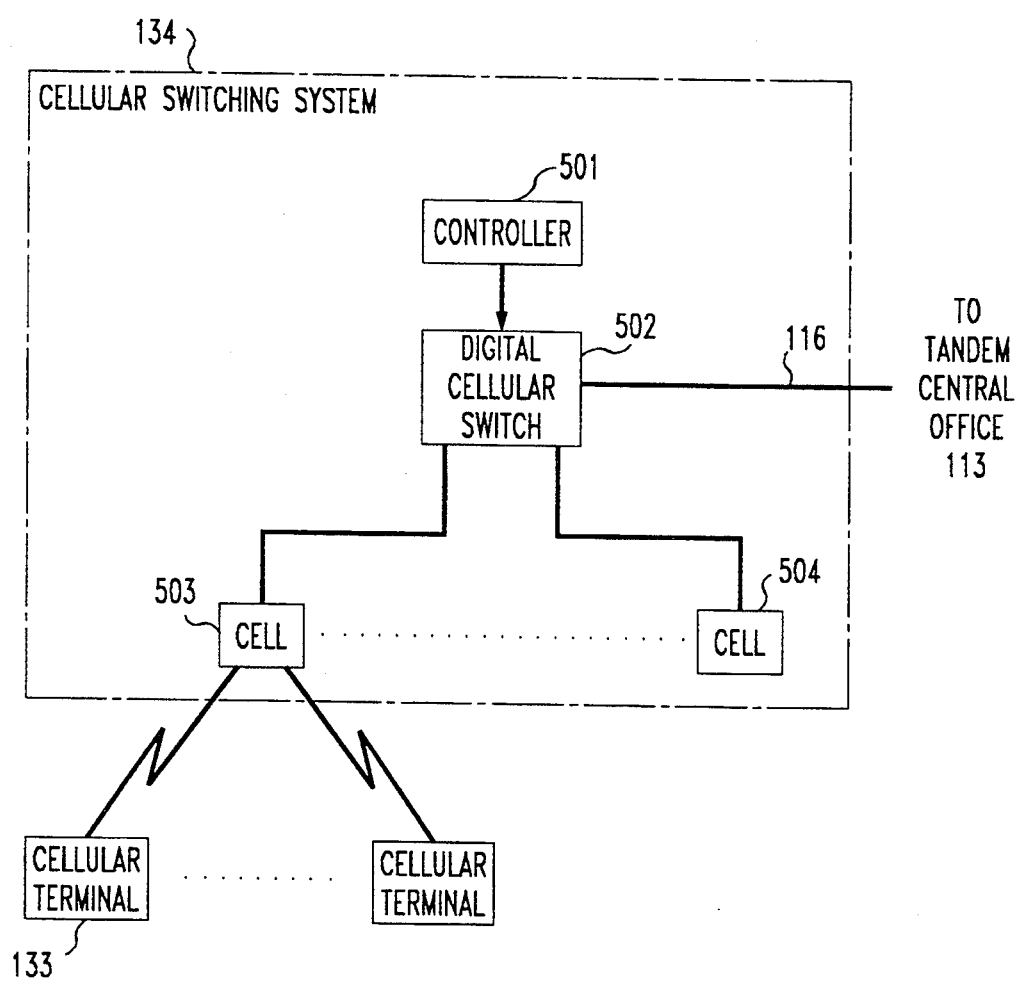
FIG. 5 illustrates, in block diagram form, a cellular switching system.

Cellular switching system 134 is illustrated in greater detail in FIG. 5. Controller 501 provides overall control for cellular switching system 134, and telecommunication switching is performed by digital cellular switch 502. Radio communication is established between cellular terminals, such as cellular terminal 133 and digital cellular switch 502 by cells 503 through 504. Greater detail on the operation of digital cellular switch 502 and cells 503 through 504 is set forth in U.S. Pat. No. 5,184,357. Upon call origination by cellular terminal 133, call origination information is transferred to controller 501 via cell 503 and digital cellular switch 502. In response, controller 501 controls the operation of digital cellular switch 502 and cell 503 to establish a call to tandem office 113 via trunks 116. When cellular switching system 134 is being utilized in FIG. 1 for a 911 call, controller 501 is responsive to geo-coordinates received from cellular terminal 133 to establish a digital link utilizing the standard ISDN protocol to PSAP 117 via tandem office 113. All digital information pertaining to the 911 call received from cellular terminal 133 is communicated to PSAP 117 via the established digital link. Greater detail on the operation controller 501 are set forth with respect to FIGS. 14 and 15. When cellular switching system 134 is utilized in FIG. 2, GBS computer 124 is directly connected to controller 501.

Figure 6:
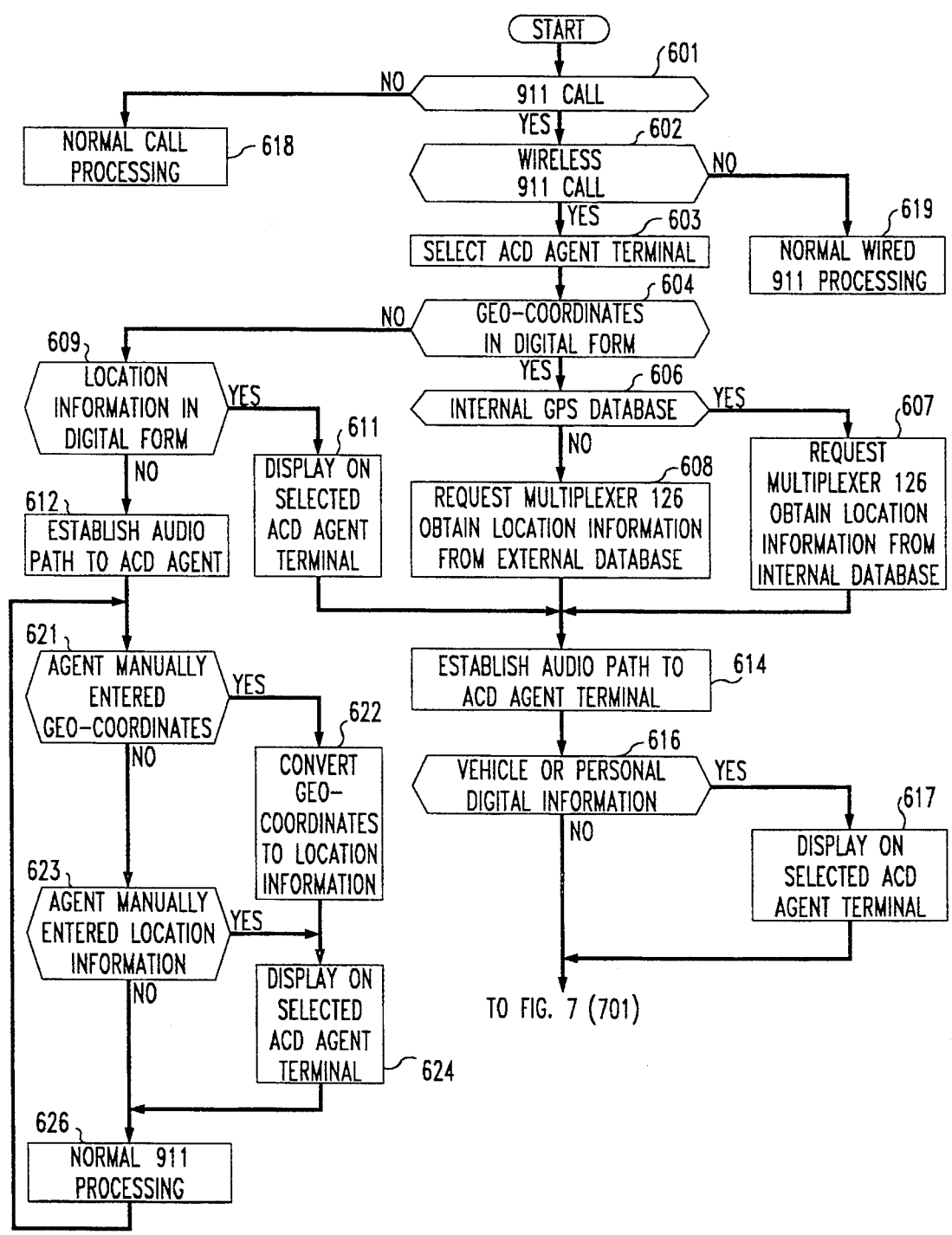
FIGS. 6 and 7 illustrate, in flowchart form, a program executed by controller 121 of PSAP 117, in accordance with the invention.
Figure 7:
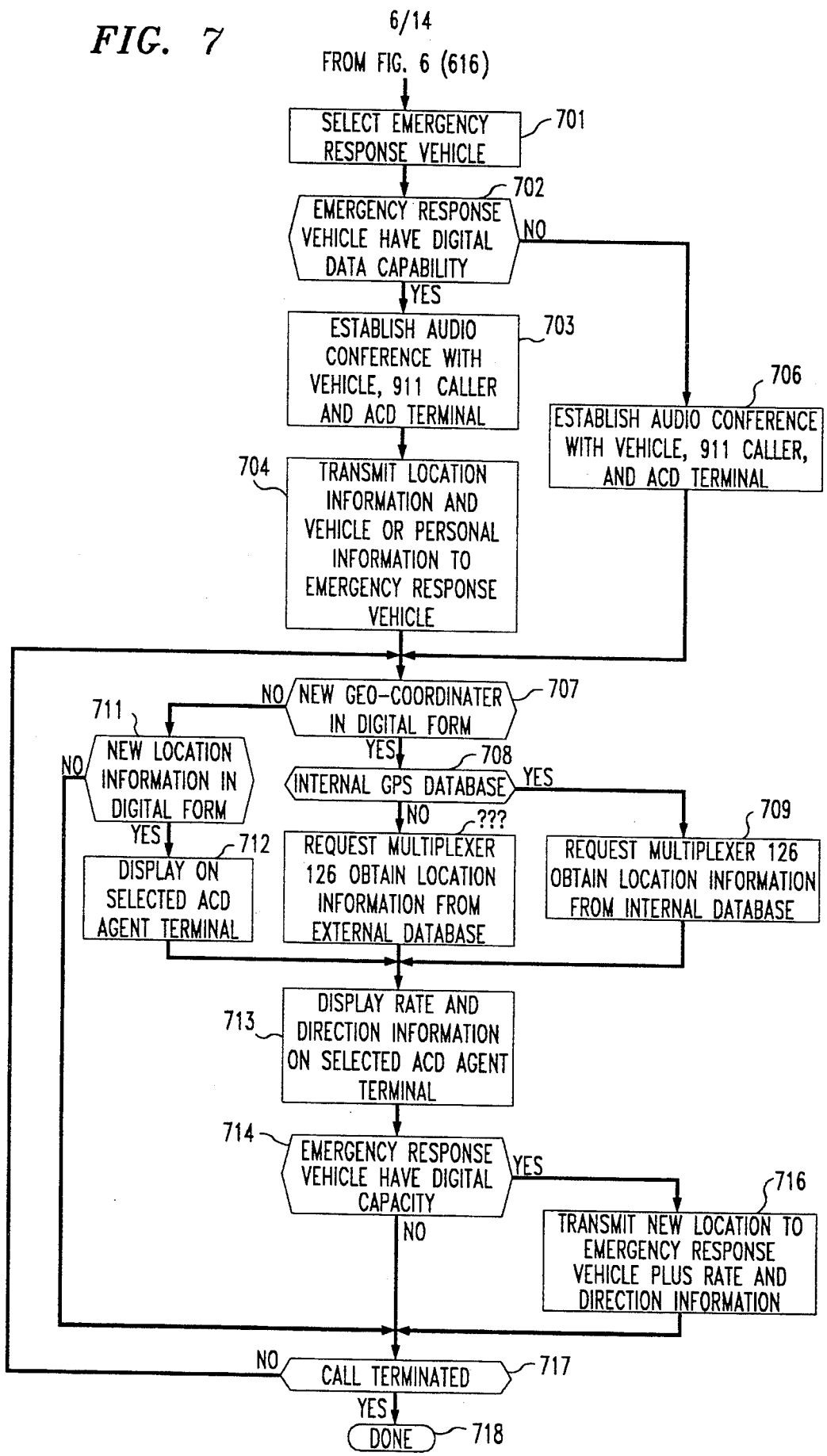

FIGS. 6 and 7 illustrate, in flowchart form, the operations performed by controller 121 of FIG. 1 or 2. For each incoming call received from tandem central office 113, decision block 601 determines whether or not the incoming call is a 911 call. If the call is not a 911 call, control is transferred to block 618 for normal call processing. If the incoming call is a 911 call, then decision block 602 determines whether or not it is a wired or wireless 911 call. If the incoming call is a wired 911 call, then control is transferred to block 619 for normal wired 911 call processing.

If the incoming call is a wireless 911 call, control is transferred to block 603 which selects a ACD agent terminal to handle the incoming call. Decision block 604 determines whether or not the geo-coordinates are in digital form. If the geo-coordinates are not present in digital form, control is transferred to decision block 609 to determine whether the actual location information is present in digital form. The location information would be in digital form if either the cellular switching system or the cellular terminal originating the 911 call was capable of converting the geo-coordinates to the location information. If the result of decision block 609 is no, then it is assumed that all the information which will be received from the cellular terminal via the cellular switching system will be in voice form as audio information; and an audio path is established to the ACD agent terminal in block 612. Next, the 911 call is processed in a normal manner by block 626. With the exception, that block 626 periodically allows the execution of blocks 621 through 625. These latter blocks allow the agent to manually enter either geo-coordinates or location information and to have the location information displayed on the agent's terminal. Block 622 converts the geo-coordinates into the location information.

Returning to decision block 609, if the result of this decision block is yes which means that digital location information was received, block 611 is executed to display the location information on the selected ACD agent terminal via multiplexer 126. Controller 121 directly supplies the location information to multiplexer 126 which then communicates the location information to the selected terminal. After execution of block 611, control is transferred to block 614 which will be discussed in the next paragraph.

Returning to decision block 604, if the geo-coordinates are present in digital form, decision block 604 transfers control to decision block 606. The latter decision block determines whether the GTS database is internal to PSAP 117 or external. In either case, block 607 or 608 requests that multiplexer 126 obtain this information from the internal or external database, respectively. After the location information has been retrieved and transferred to the selected terminal by multiplexer 126, block 614 is executed to establish an audio path between the selected ACD agent terminal and the calling cellular terminal. Next, decision block 616 is executed to determine whether the vehicle or personal digital information has been transmitted from the cellular terminal. If that digital information is available, block 617 is executed to display that digital information on the selected ACD agent terminal. After execution of blocks 617 or a negative result from decision block 616, control is transferred to block 701 of FIG. 7.

Block 701 of FIG. 7 selects an emergency responsive vehicle utilizing information from the selected ACD agent. Decision block 702 determines whether the selected emergency response vehicle has digital data capability. If the vehicle does not, control is transferred to block 706 which establishes an audio conference between the emergency response vehicle, the 911 calling terminal, and the ACD terminal. If the emergency response vehicle does have digital data capability, control is transferred to block 703 which establishes the audio conference in a manner similar to that of block 706. Next, block 704 is executed to first establish a digital link to the emergency response vehicle and then, to transmit the location information and vehicle or personal information to the emergency response vehicle using the digital link.

After execution of either block 704 or 706, decision block 707 is executed to determine if there are new geo-coordinates in digital form. This is done in case the cellular terminal is in motion and is particularly valuable where a request has been made for police assistance. If the result of decision block 707 is yes, block 708 or 709 is executed to convert the geo-coordinates to location information by accessing a external or internal database, respectively. Then, block 713 is executed.

Returning to decision block 707. If the result of decision block 707 is no, decision block 711 is executed to determine whether the new location information is in digital form. If the answer is yes, block 712 displays the new location information on the selected ACD agent terminal. If the result of decision block 711 is no, this can either mean that the cellular terminal is not transmitting digital information or there is no new geo-coordinates. In either case, control is transferred to decision block 717.

If control is transferred to block 713 from block 712, 708, or 709, block 713 displays the rate and direction information on the selected ACD agent terminal. Decision block 714 determines whether the emergency response vehicle has digital capacity. If the emergency response vehicle does have digital capacity, control is transferred to block 716 which transmits the new location information plus the rate and direction information to the emergency response vehicle so that it can display the transmitted information. Decision block 717 determines whether the call has been terminated. If the call has not been terminated, control is transferred back to decision block 707. If control has been terminated, control is transferred to block 718.

Figure 8:
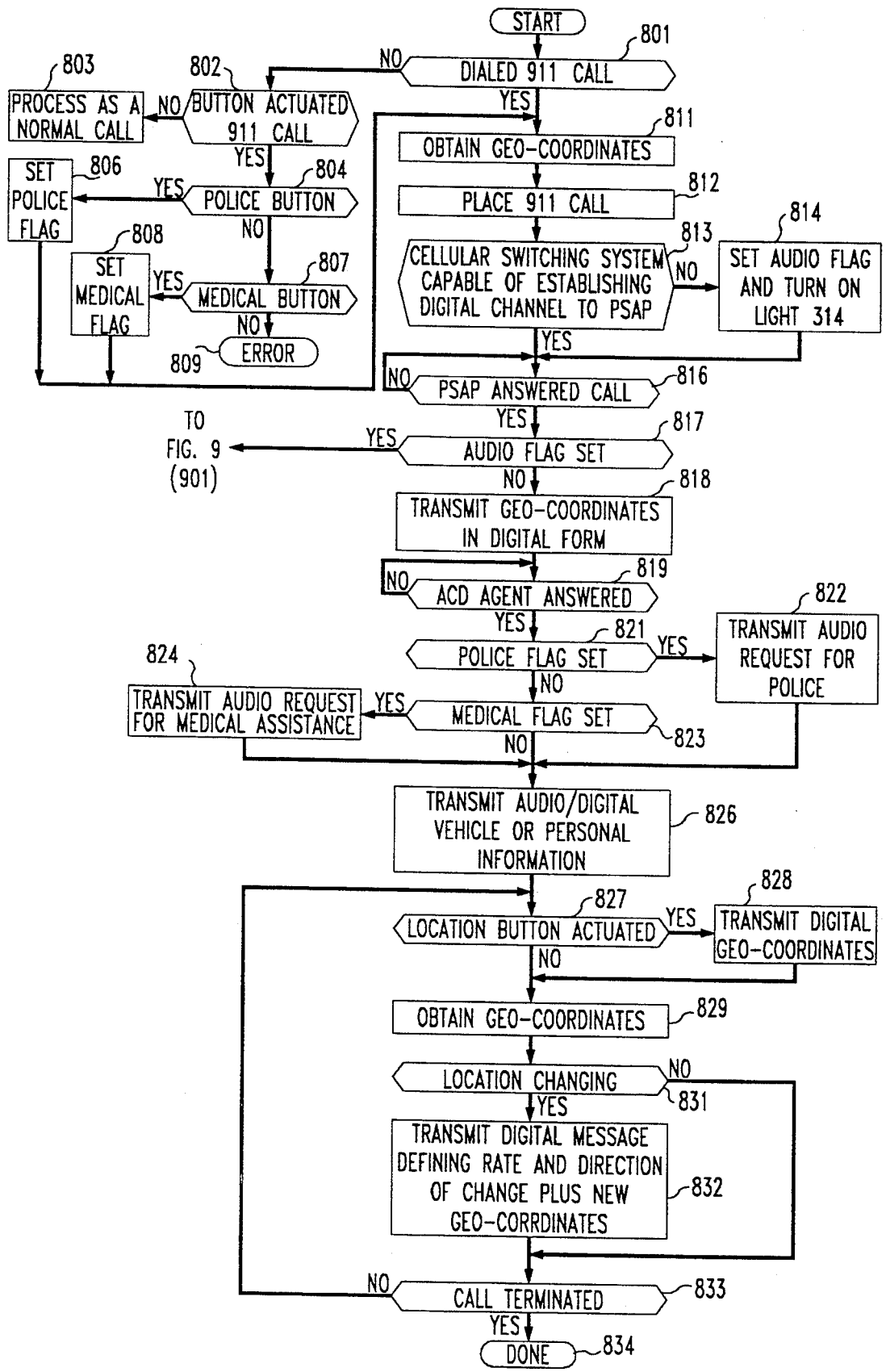
FIGS. 8 and 9 illustrate, in flowchart form, a program executed by a first embodiment of controller 301 of cellular terminal 133, in accordance with the invention.
Figure 9:
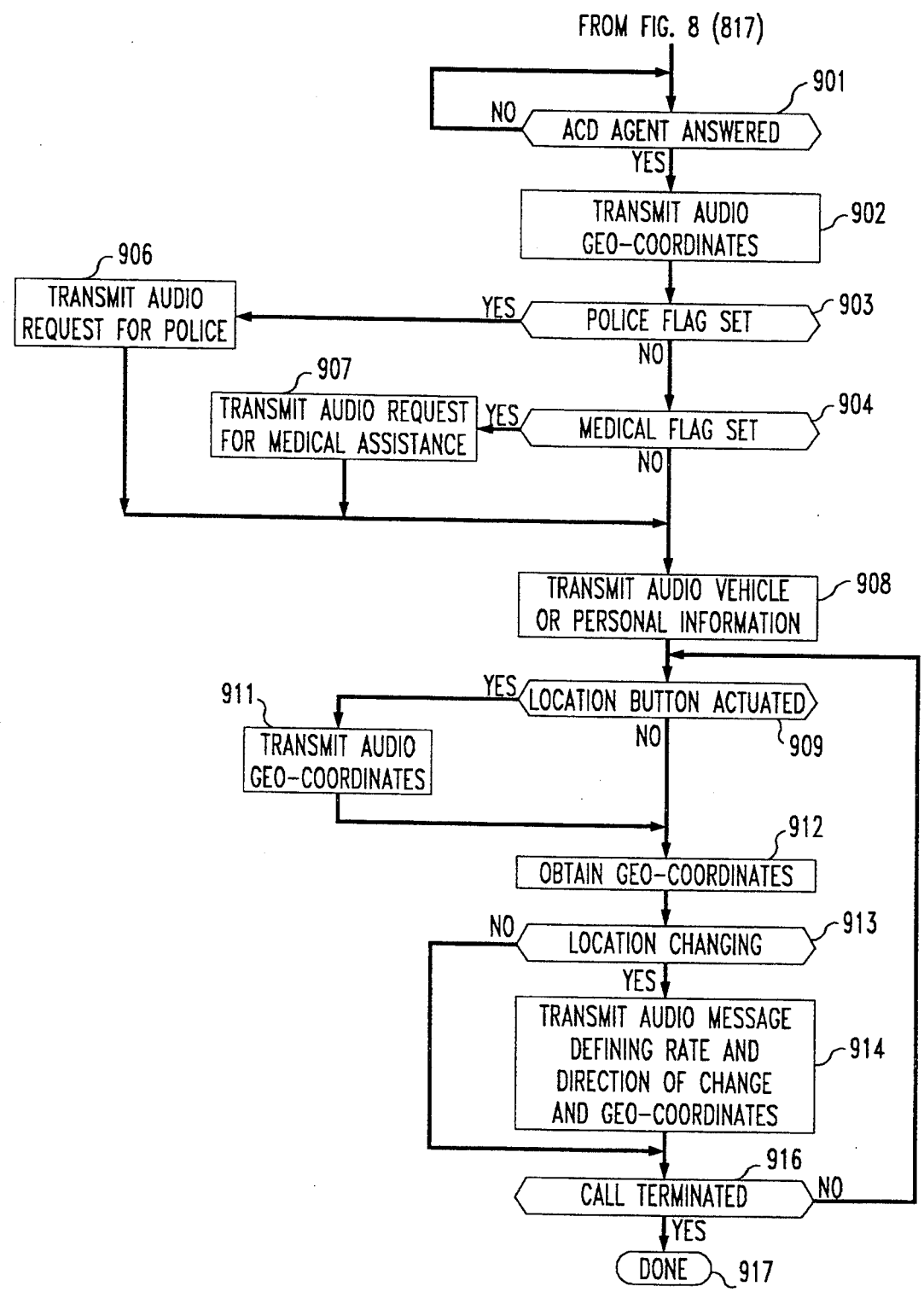

FIGS. 8 and 9 illustrate the operations performed by the program controlling controller 301 of cellular terminal 133 of FIG. 3 in a first embodiment. In the first embodiment, controller 301 is not capable of converting the geo-coordinates received from GPS device 302 into location information. Also, it is assumed that the cellular switching system does not request the geo-coordinates but that controller 301 automatically sends the geo-coordinates. However, this embodiment does allow for the fact that the cellular switching system may not be able to establish a digital channel with the PSAP and that all information will have to be sent in voice form as audio information. Upon a call being originated at cellular terminal 133, decision block 801 determines whether or not this is a dialed 911 call by examining the dialed digits. If it is not a dialed 911 call, control is transferred to decision block 802 which determines whether the call was actuated by the use of police button 305 or medical button 306. If the call was not actuated from either button, control is transferred to block 803 which processes the call in a normal manner. If the answer to decision block 802 is yes, control is transferred to decision block 804 which checks to see if the police button has been actuated. If the police button has been actuated, the police flag is set by block 806. If the police button has not been actuated, control is transferred to decision block 807 which determines if medical button 306 has been actuated. If the latter button has been actuated, the medical flag is set by block 808. If the medical button has not been actuated, control is transferred to block 809 which does an error recovery procedure. If either block 806 or 808 was executed, control is transferred to block 811 whose operations are detailed in the next paragraph.

Returning to decision block 801, if the originating call is a dialed 911 call, decision block 801 transfers control to block 811. Block 811 obtains the geo-coordinates from GPS device 302. Block 812 places a 911 call to cellular switching system 134. Decision block 813 communicates with cellular switching system 134 to verify whether or not a digital channel can be established to PSAP 117. If a digital channel cannot be established, block 814 sets the audio flag indicating that all information will have to be communicated between cellular terminal 133 and PSAP 117 as audio information only. In addition, block 814 turns on light 314 on terminal 133.

Decision block 816 waits until PSAP 117 has answered the 911 call and then transfers control to decision block 817. Decision block 817 determines on the basis of the state of the audio flag whether all information is to be communicated with PSAP 117 in the audio mode only or if audio and digital information are to be communicated with PSAP 117. If the audio flag is not set, decision block 817 transfers control to block 818. The latter block transmits the geo-coordinates to cellular switching system 134 in digital form. Decision block 819 then awaits until the selected ACD agent has answered the incoming 911 call before transferring control to decision block 821. If the police flag is set, decision block 821 transfers control to block 822 which transmits a voice request for police assistance. If the police flag is not set, control is transferred to decision block 823. The latter decision block determines whether the medical flag is set. If the medical flag is set, control is transferred to block 824 which transmits a voice request for medical assistance. After the execution of blocks 822, 823, or 824, block 825 is executed which transmits the vehicle or personal information which had been previously stored in cellular terminal 133 as both audio and digital information to PSAP 117.

After the previously described blocks have been executed, blocks 827 through 833 are continuously executed until the call is terminated. Decision block 827 checks to see if location button 307 has been actuated. If the latter button has been actuated, block 828 transmits the geo-coordinates again in digital form.

In order to determine if cellular terminal 133 is in motion, block 829 obtains the geo-coordinates from GPS device 302, and decision 831 determines from these geo-coordinates whether cellular terminal 133 is in motion. If cellular terminal 133 is in motion, block 832 transmits the rate and direction of the change plus the new geo-coordinates to PSAP 117 in the form of a digital message. Finally, decision block 833 determines if the call has been terminated by PSAP 117. If the answer is no, control is transferred back to decision block 827. However, if the call has been terminated, block 834 is executed to tear down the call.

Returning to decision block 817 of FIG. 8, if the audio flag is set, then control is transferred to block 901 of FIG. 9. The audio flag being set indicates that only audio information can be processed by PSAP 117 or cellular switching system 134. Decision block 901 determines when the ACD agent terminal answers the incoming call. When the call is answered, block 902 is executed to transmit the geo-coordinates to the terminal in voice form as audio information. Decision block 903 checks to see if the police flag was set which indicates that the call had been originated by actuation of police button 305. If the police button had been actuated, block 906 is executed to transmit a voice message requesting police assistance. If the police flag is not set, decision block 903 transfers control to decision block 904 which interrogates the medical flag. If the medical flag is set, block 907 is executed to transmit an voice message requesting medical assistance. After execution of block 906, block 907 or a negative result from decision block 904, control is transferred to block 908. The latter block transmits the prestored vehicle or personal information as a voice message.

Blocks 909 through 917 are continuously executed until the call is terminated. Decision block 909 interrogates location button 307 to determine this button has been actuated. If the button has been actuated, block 911 is executed to transmit the geo-coordinates in voice form as audio information to PSAP 117.

In order to determine if cellular terminal 133 is in motion, block 912 is executed to obtain the geo-coordinates from GPS device 302. Decision block 913 examines the new geo-coordinates to determine if cellular terminal 133 is changing its location. If the answer is yes, block 914 is executed to transmit an voice message to PSAP 117 defining the rate and direction of change plus the new geo-coordinates. Finally, decision block 916 is executed to determine if the call has been terminated. If the call has not been terminated, control is transferred back to decision block 909. If the call has been terminated, control is transferred to block 917 which tears the call down.

Figure 10:
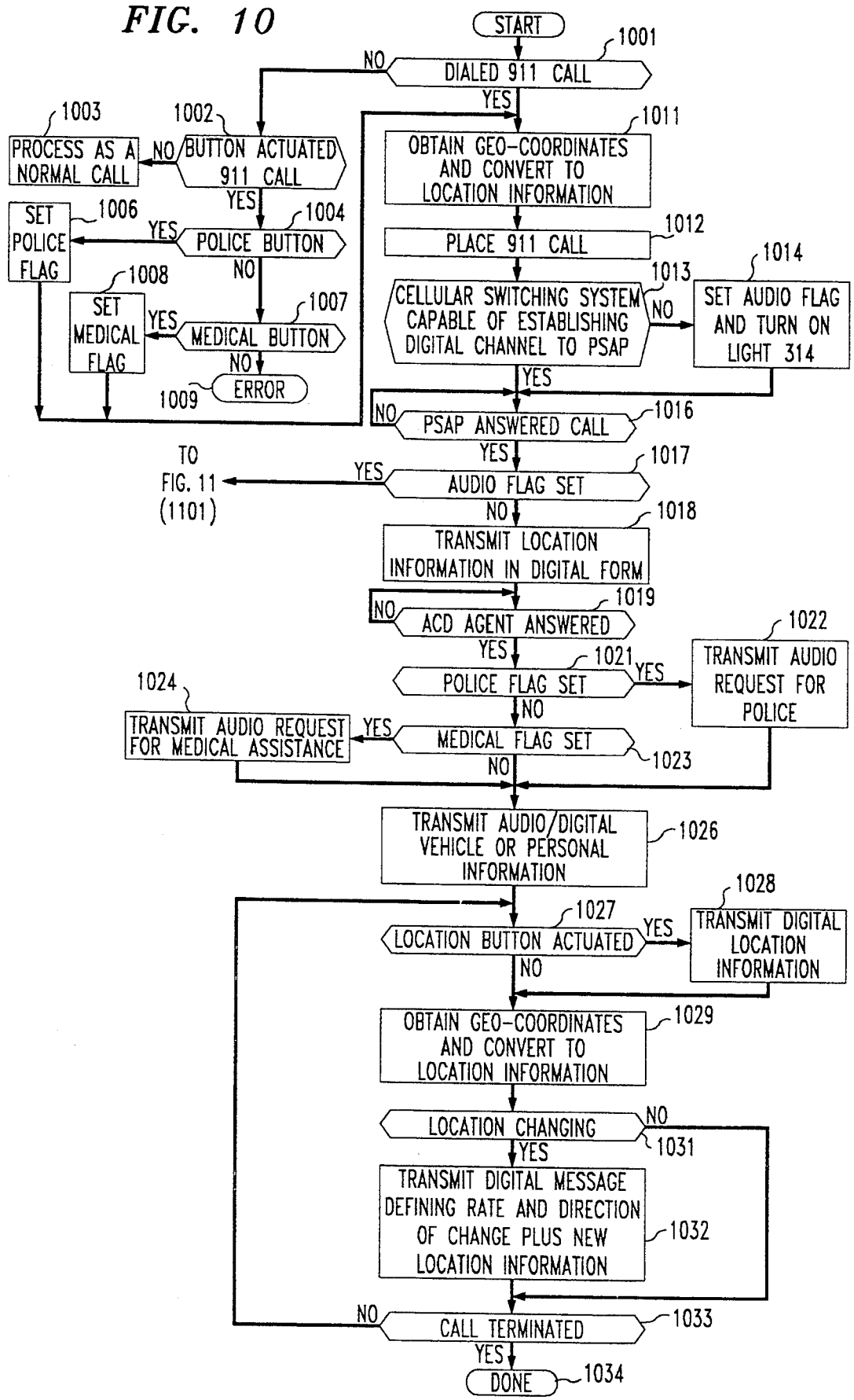
FIGS. 10 and 11 illustrate, in flowchart form, a program executed by a second embodiment of controller 301 of cellular terminal 133, in accordance with the invention.
Figure 11:
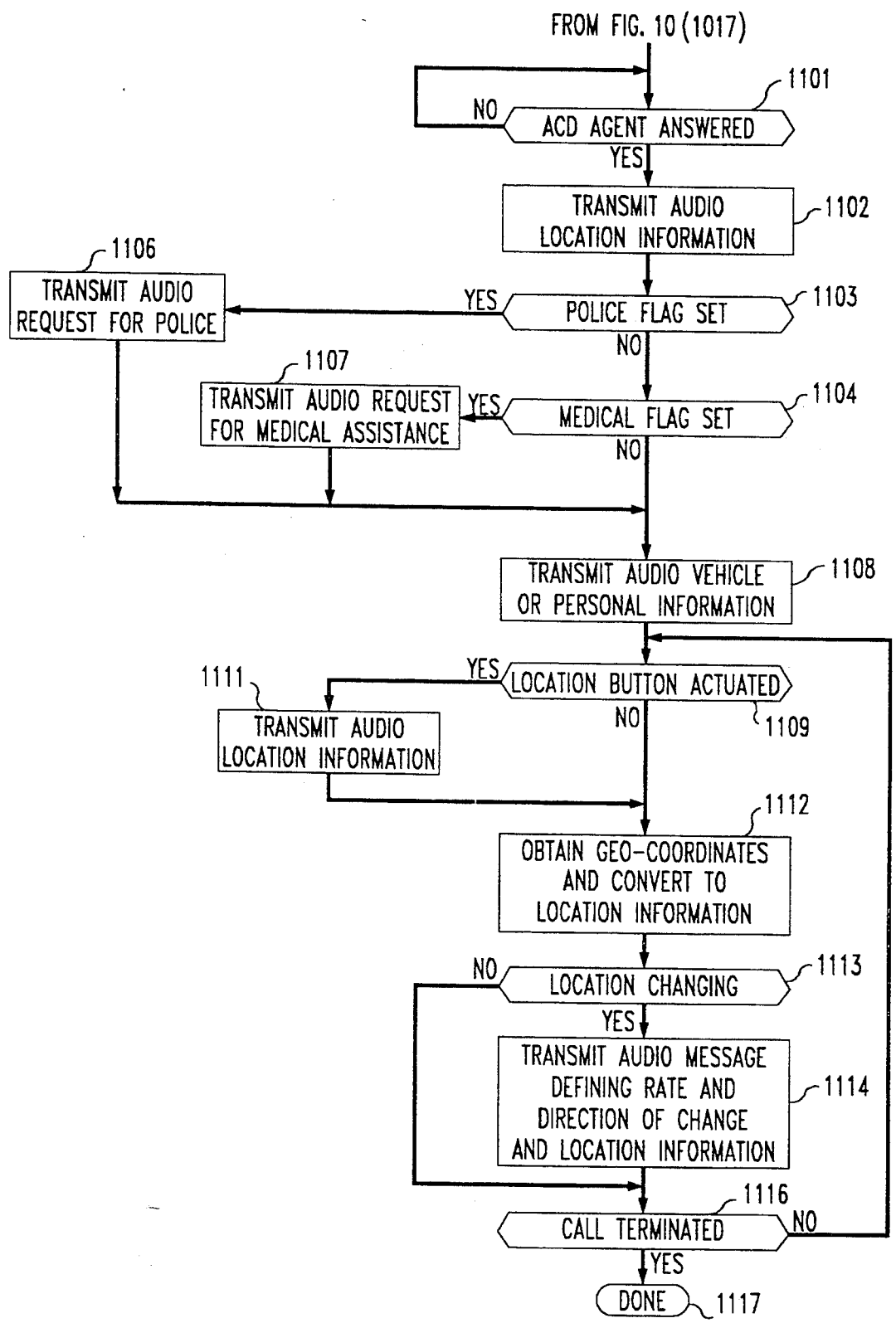

FIGS. 10 and 11 illustrate the operations performed by the program controlling controller 301 of cellular terminal 133 of FIG. 3 in a second embodiment. In the second embodiment, controller 301 converts the geo-coordinates received from GPS device 302 into digital location information. Also, it is assumed that the cellular switching system does not request the geo-coordinates but that controller 301 automatically sends the location information. However, this embodiment does allow for the fact that the cellular switching system may not be able to establish a digital channel with the PSAP and that all information will have to be sent in voice form as audio information.

Upon a call being originated at cellular terminal 133, decision block 1001 determines whether or not this is a dialed 911 call by examining the dialed digits. If it is not a dialed 911 call, control is transferred to decision block 1002 which determines whether the call was actuated by the use of police button 305 or medical button 306. If the call was not actuated from either button, control is transferred to block 1003 which processes the call in a normal manner. If the answer to decision block 1002 is yes, control is transferred to decision block 1004 which checks to see if the police button has been actuated. If the police button has been actuated, the police flag is set by block 1006. If the police button has not been actuated, control is transferred to decision block 1007 which determines if medical button 306 has been actuated. If the latter button has been actuated, the medical flag is set by block 1008. If the medical button has not been actuated, control is transferred to block 1009 which does an error recovery procedure. If either block 1006 or 1008 was executed, control is transferred to block 1011 whose operations are detailed in the next paragraph.

Returning to decision block 1001, if the originating call is a dialed 911 call, decision block 1001 transfers control to block 1011. Block 1011 obtains the geo-coordinates from GPS device 302 and converts those coordinates to location information. Block 1012 places a 911 call to cellular switching system 134. Decision block 1013 communicates with cellular switching system 134 to verify whether or not a digital channel can be established to PSAP 117. If a digital channel cannot be established, block 1014 sets the audio flag indicating that all information will have to be communicated between cellular terminal 133 and PSAP 117 as audio information only. In addition, block 1014 turns on light 314 on terminal 133.

Decision block 1016 waits until PSAP 117 has answered the 911 call and then transfers control to decision block 1017. Decision block 1017 determines on the basis of the state of the audio flag whether all information is to be communicated with PSAP 117 in the audio mode only or if audio and digital information are to be communicated with PSAP 117. If the audio flag is not set, decision block 1017 transfers control to block 1018. The latter block transmits the location information to cellular switching system 134 in digital form. Decision block 1019 then awaits until the selected ACD agent has answered the incoming 911 call before transferring control to decision block 1021. If the police flag is set, decision block 1021 transfers control to block 1022 which transmits a voice request for police assistance. If the police flag is not set, control is transferred to decision block 1023. The latter decision block determines whether the medical flag is set. If the medical flag is set, control is transferred to block 1024 which transmits a voice request for medical assistance. After the execution of blocks 1022, 1023, or 1024, block 1025 is executed which transmits the vehicle or personal information which had been previously stored in cellular terminal 133 as both audio and digital information to PSAP 117.

After the previously described blocks have been executed, blocks 1027 through 1033 are continuously executed until the call is terminated. Decision block 1027 checks to see if location button 307 has been actuated. If the latter button has been actuated, block 1028 transmits the location information again in digital form.

In order to determine if cellular terminal 133 is in motion, block 1029 obtains the geo-coordinates from GPS device 302 and converts those coordinates to location information, and decision 1031 determines from the location information whether cellular terminal 133 is in motion. If cellular terminal 133 is in motion, block 1032 transmits the rate and direction of the change plus the new location information to PSAP 117 in the form of a digital message. Finally, decision block 1033 determines if the call has been terminated by PSAP 117. If the answer is no, control is transferred back to decision block 1027. However, if the call has been terminated, block 1034 is executed to tear down the call.

Returning to decision block 1017 of FIG. 10, if the audio flag is set, then control is transferred to block 1101 of FIG. 11. The audio flag being set indicates that only audio information can be processed by PSAP 117 or cellular switching system 134. Decision block 1101 determines when the ACD agent terminal answers the incoming call. When the call is answered, block 1102 is executed to transmit the location information to the terminal in voice form as audio information. Decision block 1103 checks to see if the police flag was set which indicates that the call had been originated by actuation of police button 305. If the police button had been actuated, block 1106 is executed to transmit a voice message requesting police assistance. If the police flag is not set, decision block 1103 transfers control to decision block 1104 which interrogates the medical flag. If the medical flag is set, block 1107 is executed to transmit a voice message requesting medical assistance. After execution of block 1106, block 1107 or a negative result from decision block 1104, control is transferred to block 1108. The latter block transmits the prestored vehicle or personal information as a voice message.

Blocks 1109 through 1117 are continuously executed until the call is terminated. Decision block 1109 interrogates location button 307 to determine this button has been actuated. If the button has been actuated, block 1111 is executed to transmit the location information in voice form as audio information to PSAP 117.

In order to determine if cellular terminal 133 is in motion, block 1112 is executed to obtain the geo-coordinates from GPS device 302 and to convert those coordinates to location information. Decision block 1113 examines the new location information to determine if cellular terminal 133 is changing its location. If the answer is yes, block 1114 is executed to transmit a voice message to PSAP 117 defining the rate and direction of change plus the new location information. Finally, decision block 1116 is executed to determine if the call has been terminated. if the call has not been terminated, control is transferred back to decision block 1109. If the call has been terminated, control is transferred to block 1117 which tears the call down.

Figure 12:
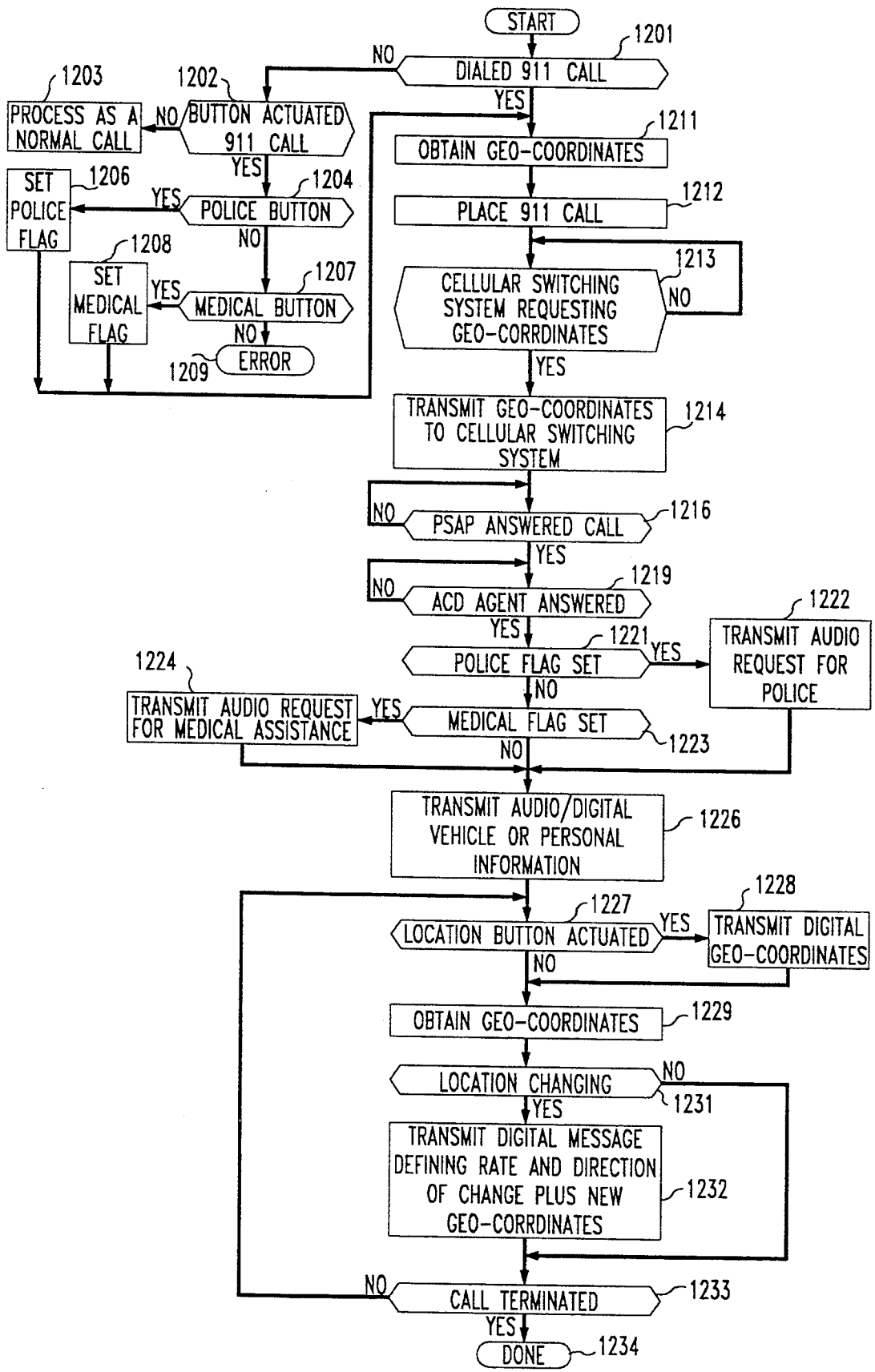
FIG. 12 illustrates, in flowchart form, a program executed by a third embodiment of controller 301 of cellular terminal 133, in accordance with the invention.

FIG. 12 illustrates the operations performed by the program controlling controller 301 of cellular terminal 133 of FIG. 3 in a third embodiment. In the third embodiment, controller 301 is not capable of converting the geo-coordinates received from GPS device 302 into location information. Also, it is assumed that the cellular switching system requests the geo-coordinates. However, this embodiment does not allow for the fact that the cellular switching system may not be able to establish a digital channel with the PSAP and that all information will have to be sent in voice form as audio information. One skilled in the art could readily add this capability using the teachings of FIGS. 8 and 9.

Upon a call being originated at cellular terminal 133, decision block 1201 determines whether or not this is a dialed 911 call by examining the dialed digits. If it is not a dialed 911 call, control is transferred to decision block 1202 which determines whether the call was actuated by the use of police button 305 or medical button 306. If the call was not actuated from either button, control is transferred to block 1203 which processes the call in a normal manner. If the answer to decision block 1202 is yes, control is transferred to decision block 1204 which checks to see if the police button has been actuated. If the police button has been actuated, the police flag is set by block 1206. If the police button has not been actuated, control is transferred to decision block 1207 which determines if medical button 306 has been actuated. If the latter button has been actuated, the medical flag is set by block 1208. If the medical button has not been actuated, control is transferred to block 1209 which does an error recovery procedure. If either block 1206 or 1208 was executed, control is transferred to block 1211 whose operations are detailed in the next paragraph.

Returning to decision block 1201, if the originating call is a dialed 911 call, decision block 1201 transfers control to block 1211. Block 1211 obtains the geo-coordinates from GPS device 302. Block 1212 places a 911 call to cellular switching system 134. Decision block 1213 waits until cellular switching system 134 requests the geo-coordinates and then, transfer control to block 1214. The later block transmits the geo-coordinates to cellular switching system 134.

Decision block 1216 waits until PSAP 117 has answered the 911 call and then transfers control to decision block 1217. Decision block 1217 determines on the basis of the state of the audio flag whether all information is to be communicated with PSAP 117 in the audio mode only or if audio and digital information are to be communicated with PSAP 117. If the audio flag is not set, decision block 1217 transfers control to block 1218. The latter block transmits the geo-coordinates to cellular switching system 134 in digital form. Decision block 1219 then awaits until the selected ACD agent has answered the incoming 911 call before transferring control to decision block 1221. If the police flag is set, decision block 1221 transfers control to block 1222 which transmits a voice request for police assistance. If the police flag is not set, control is transferred to decision block 1223. The latter decision block determines whether the medical flag is set. If the medical flag is set, control is transferred to block 1224 which transmits a voice request for medical assistance. After the execution of blocks 1222, 1223, or 1224, block 1225 is executed which transmits the vehicle or personal information which had been previously stored in cellular terminal 133 as both audio and digital information to PSAP 117.

After the previously described blocks have been executed, blocks 1227 through 1233 are continuously executed until the call is terminated. Decision block 1227 checks to see if location button 307 has been actuated. If the latter button has been actuated, block 1228 transmits the geo-coordinates again in digital form.

In order to determine if cellular terminal 133 is in motion, block 1229 obtains the geo-coordinates from GPS device 302, and decision 1231 determines from these geo-coordinates whether cellular terminal 133 is in motion. If cellular terminal 133 is in motion, block 1232 transmits the rate and direction of the change plus the new geo-coordinates to PSAP 117 in the form of a digital message. Finally, decision block 1233 determines if the call has been terminated by PSAP 117. If the answer is no, control is transferred back to decision block 1227. However, if the call has been terminated, block 1234 is executed to tear down the call.

Figure 13:
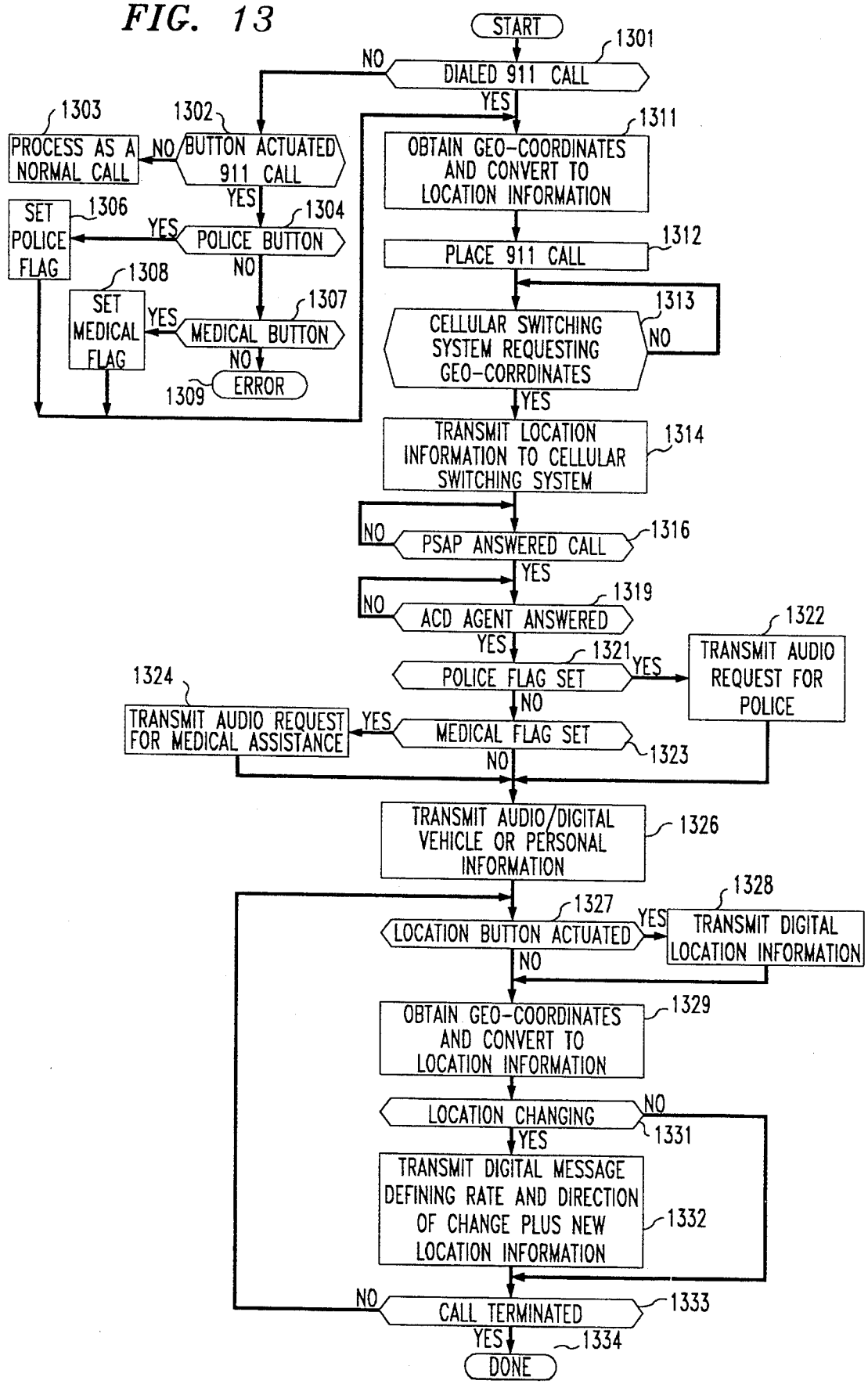
FIG. 13 illustrates, in flowchart form, a program executed by a fourth embodiment of controller 301 of cellular terminal 133, in accordance with the invention.

FIG. 13 illustrates the operations performed by the program controlling controller 301 of cellular terminal 133 of FIG. 3 in a fourth embodiment. In the fourth embodiment, controller 301 is capable of convening the geo-coordinates received from GPS device 302 into location information. Also, it is assumed that the cellular switching system requests the location information. However, this embodiment does not allow for the fact that the cellular switching system may not be able to establish a digital channel with the PSAP and that all information will have to be sent in voice form as audio information. One skilled in the art could readily add this capability using the teachings of FIGS. 10 and 11.

Upon a call being originated at cellular terminal 133, decision block 1301 determines whether or not this is a dialed 911 call by examining the dialed digits. If it is not a dialed 911 call, control is transferred to decision block 1302 which determines whether the call was actuated by the use of police button 305 or medical button 306. If the call was not actuated from either button, control is transferred to block 1303 which processes the call in a normal manner. If the answer to decision block 1302 is yes, control is transferred to decision block 1304 which checks to see if the police button has been actuated. If the police button has been actuated, the police flag is set by block 1306. If the police button has not been actuated, control is transferred to decision block 1307 which determines if medical button 306 has been actuated. If the latter button has been actuated, the medical flag is set by block 1308. If the medical button has not been actuated, control is transferred to block 1309 which does an error recovery procedure. If either block 1306 or 1308 was executed, control is transferred to block 1311 whose operations are detailed in the next paragraph.

Returning to decision block 1301, if the originating call is a dialed 911 call, decision block 1301 transfers control to block 1311. Block 1311 obtains the geo-coordinates from GPS device 302 and converts those coordinates into location information. Block 1312 places a 911 call to cellular switching system 134. Decision block 1313 waits until cellular switching system 134 requests the location information and then, transfer control to block 1314. The later block transmits the location information to cellular switching system 134. Decision block 1319 then awaits until the selected ACD agent has answered the incoming 911 call before transferring control to decision block 1321. If the police flag is set, decision block 1321 transfers control to block 1322 which transmits a voice request for police assistance. If the police flag is not set, control is transferred to decision block 1323. The latter decision block determines whether the medical flag is set. If the medical flag is set, control is transferred to block 1324 which transmits a voice request for medical assistance. After the execution of blocks 1322, 1323, or 1324, block 1325 is executed which transmits the vehicle or personal information which had been previously stored in cellular terminal 133 as both audio and digital information to PSAP 117.

After the previously described blocks have been executed, blocks 1327 through 1333 are continuously executed until the call is terminated. Decision block 1327 checks to see if location button 307 has been actuated. If the latter button has been actuated, block 1328 transmits the location information again in digital form.

In order to determine if cellular terminal 133 is in motion, block 1329 obtains the geo-coordinates from GPS device 302 and converts those coordinates to location information, and decision 1331 determines from the location information whether cellular terminal 133 is in motion. If cellular terminal 133 is in motion, block 1332 transmits the rate and direction of the change plus the new location information to PSAP 117 in the form of a digital message. Finally, decision block 1333 determines if the call has been terminated by PSAP 117. If the answer is no, control is transferred back to decision block 1327. However, if the call has been terminated, block 1334 is executed to tear down the call.

Figure 14:
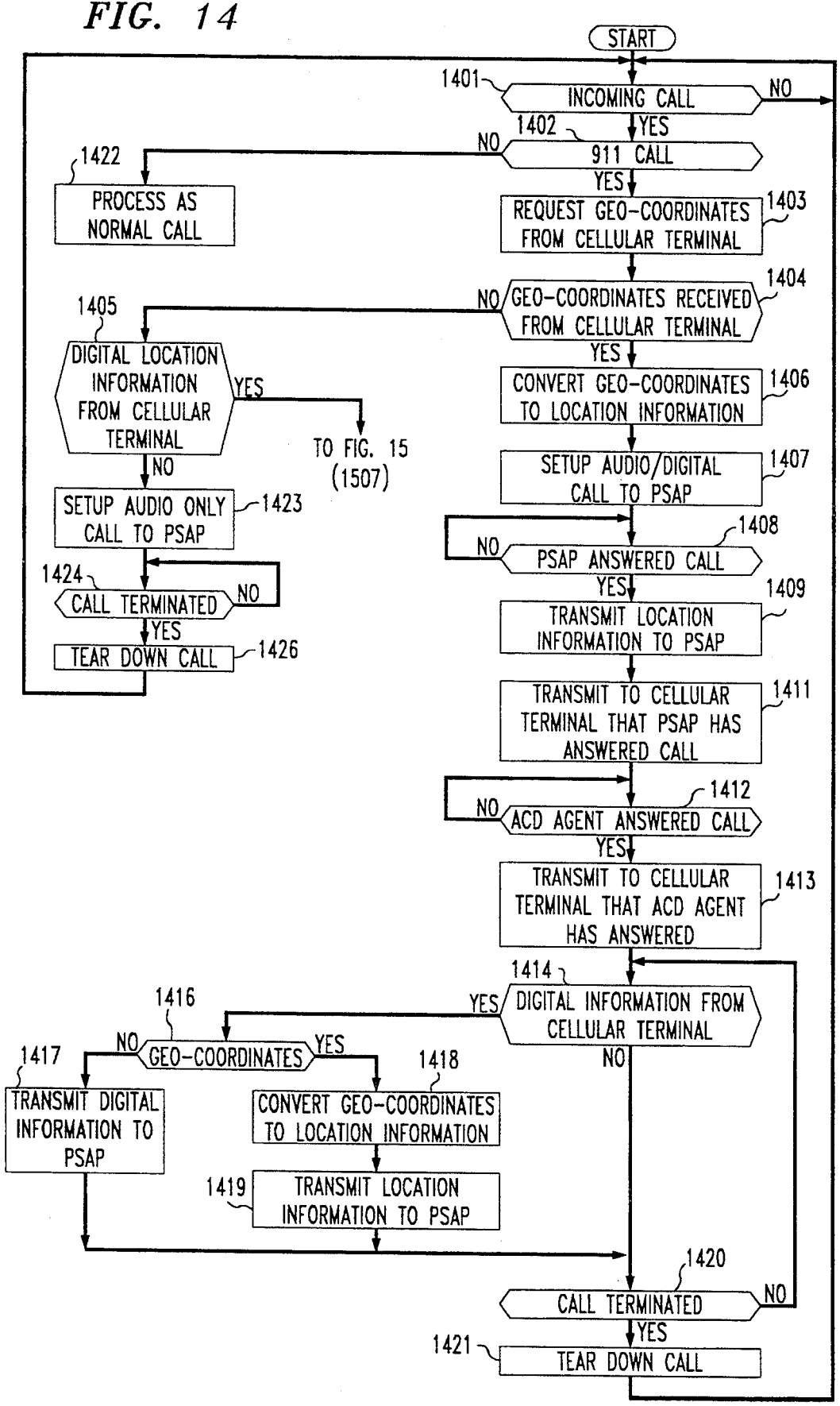
FIGS. 14 and 15 illustrate, in flowchart form, a program executed by controller 501 of cellular switching system 134.

FIG. 14 illustrates, in flowchart form, a program executed by one embodiment of controller 501 of FIG. 5. This embodiment allows controller 501 to access GPS computer 124 of FIG. 2 in order to convert the geo-coordinates received from cellular terminal 133 to location information. In addition, this embodiment requires that controller 501 of cellular switching system 134 initially request the geo-coordinates from cellular terminal 133. Also, if cellular terminal 133 can convert the geo-coordinates to digital location information, this embodiment, as illustrated in FIG. 1, can process the location information without GPS computer 124.

Decision block 1401 detects when an incoming call is received from a cellular terminal and transfers this call to decision block 1402. Decision block 1402 determines if the call is a 911 call. If the call is not a 911 call, control is transferred to block 1422 which processes this call as a normal cellular call. If the call is a 911 call, control is transferred to block 1403 which transmits a digital message to cellular terminal 133 requesting the geo-coordinates or location information.

Decision blocks 1404 and 1405 determine based on message received from cellular terminal 133 in response to the message transmitted by block 1403 whether the cellular terminal is capable of establishing a digital link. If the cellular terminal is not capable of establishing a digital link, then control is transferred to block 1423 which sets up an audio-only call to PSAP 117. Blocks 1424 and 1426 perform the operations of waiting for the call to be terminated, tearing that call down upon the call being terminated, and returning control to decision block 1401. Returning to decision block 1404, if the geo-coordinates are received from cellular terminal 133, control is transferred to block 1406 which converts those geo-coordinates into location information. If the result in decision block 1404 is no, decision block 1405 determines if digital location information was received. If the answer is yes, decision block 1405 transfers control to block 1507 of FIG. 15. Block 1407 sets up an audio/digital call to PSAP 117. Decision block 1408 waits until PSAP 117 answers the combined call and then transfers control to decision block 1409 which utilizes the digital link portion of the call to transmit the location information to PSAP 117. After execution of block 1409, block 1411 transmits to the cellular terminal the fact that PSAP 117 has answered the call. Decision block 1412 determines when the ACD agent has answered the call and transfers control to block 1413 when the agent has answered. Block 1413 informs the cellular terminal the fact that the ACD agent is now on the call.

Blocks 1414 through 1420 are continuously executed until the call is terminated which is detected by decision block 1420. Once the call has been terminated, control is transferred to block 1421 which tears down the call and returns control to decision block 1401. Decision block 1414 determines whether any digital information has been received from the cellular terminal. If the answer is yes, decision block 1416 determines whether this information defines new geo-coordinates. If the information does define new geo-coordinates, block 1418 converts those geo-coordinates to location information, and block 1419 transmits this new location information to PSAP 117. If the digital information is not new geo-coordinates information, decision block 1416 transfers control to block 1417 which transmits the digital information to PSAP 117. The non-geo-coordinates digital information relates to such things as vehicle or personal digital information. After execution of either block 1417 or 1419, control is transferred to decision block 1420 which checks for the termination of the call.

Figure 15:
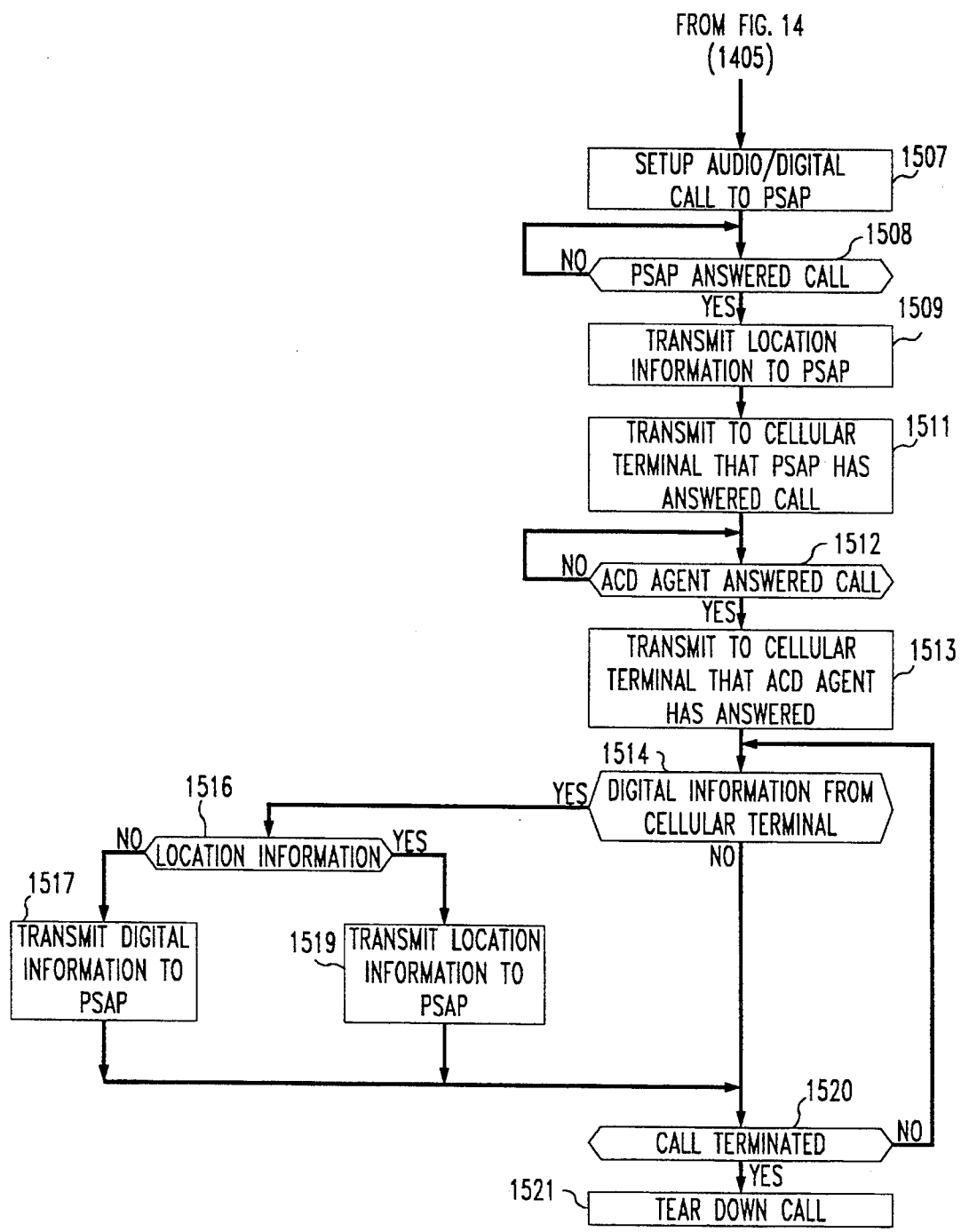

Block 1507 of FIG. 15 sets up an audio/digital call to PSAP 117. Decision block 1508 waits until PSAP 117 answers the combined call and then transfers control to decision block 1509 which utilizes the digital link portion of the call to transmit the location information to PSAP 117. After execution of block 1509, block 1511 transmits to the cellular terminal the fact that PSAP 117 has answered the call. Decision block 1512 determines when the ACD agent has answered the call and transfers control to block 1513 when the agent has answered. Block 1513 informs the cellular terminal the fact that the A CD agent is now on the call.

Blocks 1514 through 1520 are continuously executed until the call is terminated which is detected by decision block 1520. Once the call has been terminated, control is transferred to block 1521 which tears down the call and returns control to decision block 1501. Decision block 1514 determines whether any digital information has been received from the cellular terminal. If the answer is yes, decision block 1516 determines whether this information defines new location information. Block 1519 transmits this new location information to PSAP 117. If the digital information is not new location information, block 1516 transfers control to block 1517 which wants the digital information to PSAP 117. The non-digital location information relates to such things as vehicle or personal digital information. After execution of either block 1517 or 1519, control is transferred to decision block 1520 which checks for the termination of the call.

It is to be understood that the above-described embodiments are merely illustrative of the principles of this invention and that other arrangements may be devised by those skilled in the art without departing from the spirit and scope of the invention.

I claim:

1. A cellular switching system for providing public emergency call service to a cellular telephone set, comprising:

means for detecting a public emergency call from a cellular telephone set;

means for requesting the transmission of geo-coordinates from the cellular telephone set;

means for converting the geo-coordinates received as digital information from the cellular telephone set to location information;

means for establishing a digital link to the public safety answering point system;

means for transmitting the location information to a public safety answering point system and for establishing a voice communication path between the cellular telephone set and the public safety answering point system;

the convening means further adapted for translating the location information into audio information upon the means for establishing the digital link being unable to establish a digital link to the public safety answering point system; and the transmitting means further adapted for communicating the audio information to the public safety answering point system.

2. The cellular switching system of claim 1 wherein the digital information comprises additional information concerning the emergency call and the transmitting means further transmits this additional information to the public safety answering point system.

3. The cellular switching system of claim 1 wherein the converting means comprises an internal data base in the cellular switching system.

4. The cellular switching system of claim 1 wherein the converting means comprises a data base external to the cellular switching system, and the cellular switching system comprises means for accessing the external data base.

5. The cellular switching system of claim 2 wherein the converting means comprises means for translating the additional information into audio information upon the establishing means being unable to establish a digital link to the public safety answering point system; and the transmitting means further comprises means for communicating the audio information to the public safety answering point system.

6. A cellular switching system for providing emergency call service to a cellular telephone set, comprising:

means for detecting an emergency call from a cellular telephone set;

means for requesting the transmission of location information from the cellular telephone set;

means for receiving the location information as digital information from the cellular telephone set;

means for establishing a digital link to the public safety answering point system;

means for transmitting the location information to a public safety answering point system and for establishing a voice communication path between the cellular telephone set and the public safety answering point system;

means for translating the location information into audio information upon the means for establishing the digital link being unable to establish a digital link to the public safety answering point system; and the transmitting means further comprises means for communicating the audio information to the public safety answering point system.

7. The cellular switching system of claim 6 wherein the digital information comprises additional information concerning the emergency call and the transmitting means further transmits this additional information to the public safety answering point system.

8. The cellular switching system of claim 7 further comprises means for translating the additional information into audio information upon the establishing means being unable to establish a digital link to the public safety answering point system; and the transmitting means further comprises means for communicating the audio information to the public safety answering point system.

9. A method for controlling a cellular switching system to provide emergency call service to a cellular telephone set, the method comprising the steps of:

detecting an emergency call from a cellular telephone set;

requesting the transmission of geo-coordinates from the cellular telephone set;

converting the geo-coordinates received as digital information from the cellular telephone set to location information;

establishing a digital link to the public safety answering point system;

transmitting the location information to a public safety answering point system;

establishing a voice communication path between the cellular telephone set and the public safety answering point system;

translating the location information into audio information upon the step of establishing the digital link being unable to establish a digital link to the public safety answering point system; and the transmitting step further comprises the step of communicating the audio information to the public safety answering point system.

10. The method of claim 9 wherein the digital information comprises additional information concerning the emergency call and the transmitting step further transmits this additional information to the public safety answering point system.

11. The method of claim 9 wherein the converting step uses an internal data base in the cellular switching system.

12. The method of claim 9 wherein the convening step uses a data base external to the cellular switching system, and the method further comprises the step of accessing the external data base.

13. The method of claim 9 wherein the convening step comprises the step of translating the additional information into audio information upon the establishing step being unable to establish a digital link to the public safety answering point system; and the transmitting step further comprises the step of communicating the audio information to the public safety answering point system.

14. A method for controlling a cellular switching system to provide emergency call service to a cellular telephone set, the method comprising the steps of:

detecting an emergency call from a cellular telephone set;

requesting the transmission of location information from the cellular telephone set;

receiving the location information as digital information from the cellular telephone set;

establishing a digital link to the public safety answering point system;

transmitting the location information to a public safety answering point system;

establishing a voice communication path between the cellular telephone set and the public safety answering point system;

translating the location information into audio information upon the step of establishing the digital link being unable to establish a digital link to the public safety answering point system; and the transmitting step further comprises the step of communicating the audio information to the public safety answering point system.

15. The method of claim 14 wherein the digital information comprises additional information concerning the emergency call and the transmitting step further transmits this additional information to the public safety answering point system.

16. The method of claim 15 further comprises the step of translating the additional information into audio information upon the establishing step being unable to establish a digital link to the public safety answering point system; and the transmitting step further comprises the step of communicating the audio information to the public safety answering point system.

* * * * *